United States Patent Office 2,926,985
Patented Mar. 1, 1960

2,926,985

COLOURING PREPARATIONS

Pierre Petitcolas, Rouen, Robert Frederic Michel Sureau, Enghien-les-Bains, and Juliette Nicole Cyna, nee Blum, Nantes, France, assignors to Compagnie Française des Matieres Colorantes, Paris, France, a French company No Drawing. Application February 24, 1956
Serial No. 567,442

Claims priority, application France March 2, 1955

4 Claims. (Cl. 8—42)

The present invention concerns improvements in and relating to colouring preparations.

It is known that the azo dyestuffs corresponding to the general formula:

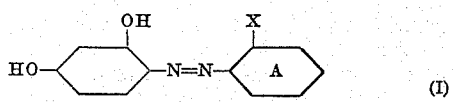

(I)

in which X represents an OH or COOH group and in which the benzene ring A may be substituted by non-solubilising groups such as halogen atoms, or alkyl, alkoxy, nitro, sulphonamido, acylamino, or sulphone groups are capable of fixing from their salts metals of the transition series, that is, the atomic number of which is between 24 and 29. They thus form metalliferous complexes which have already been proposed as coupling components which may be used in dyeing or textile printing; in fact, these complexes generally possess a certain degree of solubility in a dilute alkaline medium and are capable of coupling with diazo compounds.

This property has been turned to account for the preparation of mixtures applicable to textile printing. So it is that mixtures of the complexes defined above with certain diazoamino derivatives have already been made. But the mixtures of these complexes with diazoamino derivatives prepared up to now have all required development in an acid medium. It is only mixtures of these complexes with nitrosamines which allow of development in a neutral medium but the disadvantages of the nitrosamines are well known.

The present invention has as its object mixtures of metalliferous complexes of dyes of the general Formula I with diazoamino derivatives capable of being obtained by the condensation, in a non-acid medium, of diazo or tetrazo derivatives of amines which contain no solubilising groups with anthranilic acid derivatives of the general Formula II given below, or with their water-soluble salts:

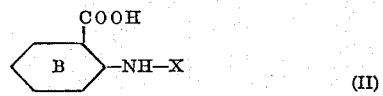

(II)

in which formula the benzene ring B is substituted by a member selected from the group consisting of the hydrogen atom, the halogen atoms, and the alkyl, aralkyl, alkoxy, carboxy, sulpho, sulphonamido, N-alkyl-sulphonamido, N-carboxyalkyl-sulphonamido, and N-sulphoalkyl-sulphonamido groups, and X represents a member selected from the group consisting of the unsubstituted alkyl and cycloalkyl groups and the alkyl and cycloalkyl groups substituted by a member selected from the group consisting of the —OH, —COOH, —OSO$_3$H, —SO$_3$H, —OCH$_3$, —OC$_2$H$_5$, —COO Alk and —CONH$_2$ groups. These new mixtures can be dissolved in a dilute alkali and when the solution thus obtained is used with a suitable thickening agent and is printed on cotton or other natural or artificial cellulosic textile material, and the fabric is dried and subjected to the action of steam, a development of brown shades showing as a whole good general fastness is observed.

The diazoamino derivatives which may be used for the production of the mixtures of the invention may be selected from those described in U.S. Patent No. 2,675,374, U.S. Patent No. 2,858,301 and French Patents Nos. 1,060,993, 1,067,249, 1,093,008, 1,095,386, 1,048,-206, 1,096,490, 875,276, 1,069,048 and 1,121,646.

The metalliferous complexes with which the above-mentioned diazoamino derivatives are mixed can be obtained from dyestuffs of the general Formula I by the known general methods of metallisation. It has been found, however—and this constitutes a particular object of the invention—that it is advantageous in many cases to operate in the following way:

The dyestuff is metallised in aqueous alkaline solution by a salt or a hydroxide of a metal having an atomic number of 24 to 29, in the presence of an amine or an organic amide. Suitable amines or amides are, for example, alkanolamines such as the mono-, di- and triethanolamines, the propanolamines, diethylethanolamine, formamide, dimethylformamide, cyclohexylamine, and pyridine and its homologues. A solution of a complex salt of the metal in question with a mineral or organic acid and with the amine or amide may be prepared separately and then added to the aqueous alkaline solution of the dyestuff. Also, the metal salt or hydroxide may be reacted with the dyestuff in solution in the amide or amine, or else a metal hydroxide may be reacted in suspension in the aqueous solution of the dyestuff in the presence of the amine or the organic amide. The metalliferous complexes thus prepared derived from azo compounds of the Formula I, can be separated by salting out, acidification or dilution and acidification if the operation is in a solvent medium. They generally show a much better solubility in dilute alkaline medium than the complexes prepared in the absence of amines or organic amides, and it is found that, on using these new complexes according to the printing process described above, shades are obtained which are perfectly uniform, much richer, and endowed with at least equivalent fastness.

The new mixtures and the new complexes obtained according to the invention form an important addition to the range of dyes for textile printing which are capable of being developed by neutral steaming; in fact, they provide very fast brown shades from compounds which are readily accessible and cheap.

The invention will be more clearly understood by reference to the following examples which are purely illustrative. The parts mentioned mean parts by weight except when the contrary is indicated.

Example 1

46 parts of 2:2':4-trihydroxy-azobenzene are dissolved in the cold in 200 parts of water and 60 parts by volume of a 10 N solution of caustic soda. A solution of 57 parts of anhydrous crystalline cobalt sulphate in 120 parts of water at 50–60° C. and 80 parts by volume of monoethanolamine is also prepared. The clear mixture is poured into the solution of the dye and left to mix for an hour without heating, and the complex of the dye is then precipitated by the addition of 120 parts by volume of 10 N hydrochloric acid. The complex is filtered, drained, washed with cold water and dried under vacuum at a temperature of 45° C.–50° C.

12 parts of this complex are mixed with 48 parts of a diazoamino compound obtained by the condensation of the diazo compound of p-chloro-o-aminoanisole with N-(2-carboxyphenyl)-glycine and titrating 32% of a base of molecular weight 157. This mixture is made into a paste with 15 parts of a 36° Bé. solution of caustic soda and 50 parts of ethyl alcohol and dissolved by the addition of 315 parts of lukewarm water. The solution is then thickened by the addition of 550 parts of a thickener based on starch and tragacanth; 10 parts of a 7.5 solution of sodium chromate are added, and the homogeneous paste obtained is sieved.

After printing on cellulosic fabric, the fabric is dried in the oven and treated in a Mather Platt with neutral steam at ordinary pressure for four to five minutes. After soaping, rinsing and drying under the usual conditions, a full-bodied and very uniform chocolate brown shade is obtained, which has excellent general fastness.

The complex of the same dye prepared in the absence of ethanolamine gives, under the same conditions, a shade which is less substantial, irregular and of poor uniformity.

Example 2

55 parts of crystalline copper sulphate are dissolved in 150 parts of hot water, 110 parts by volume of monoethanolamine are added, and the intense blue solution obtained is introduced into the solution of the dye prepared as in Example 1 with 46 parts of that dyestuff. The mixture is stirred for a quarter of an hour at 60–70° C., allowed to cool, and the complex precipitated on neutralising with 160 parts by volume of 10 N hydrochloric acid. It is left to settle for twenty-four hours and the precipitate is filtered, drained and dried at a temperature of 45° C.–50° C.

A printing paste is prepared with this complex in a manner similar to that described in Example 1. The shade obtained after development in neutral steam is a brown which is a little more yellowish than the previous one, and also having excellent general fastness.

The complex of the same dye, treated with a copper salt in the absence of an organic base, leads to less full-bodied shades; on the other hand, the printing pastes foam and are too unstable.

Example 3

The cobalt sulphate-monoethanolamine complex in Example 1 is replaced by a complex prepared with 57 parts of crystalline cobalt sulphate dissolved in 120 parts of water and 62 parts of formamide. After mixing with the solution of the dye such as is described in Example 1, the mixture is heated at 60–70° C. for a quarter of an hour. A part of the complex is precipitated. The precipitation is finished by neutralising by means of hydrochloric acid. The precipitate is filtered and dried at a temperature of 45° C.–50° C. When used under the same conditions as those in Example 1, it gives equivalent tintorial results.

Example 4

144 parts of diethanolamine or 98 parts by volume of diethylethanolamine, or 160 parts by volume of cyclohexylamine, or 108 parts by volume of pyridine, are added at 70° C. to a solution of 57 parts of crystalline cobalt sulphate in 120 parts of water. Contrary to what was observed in the preceding examples, the addition of these amines to the cobalt sulphate solution does not give soluble cobalt complexes. The suspension obtained is added to the solution of the dye as described in Example 1 and the mixture is heated for an hour at 70° C. It all goes into solution. The complex is precipitated by neutralisation with hydrochloric acid.

When used as directed in Example 1, these various complexes lead to approximately equivalent results.

Example 5

On replacing the dye mentioned in Example 1 by 53 parts of 5-chloro-2:2':4-trihydroxy-azobenzene, and on finishing the preparation of the complex and the printing paste in a similar manner, there is obtained, after neutral development, a chocolate brown shade whose tinctorial yield and fastness are equivalent to those of the complex of Example 1.

Example 6

On replacing the diazoamino compound used in the printing paste composition described in Example 1 by one of the following compounds.

66 parts of the compound obtained by condensing the diazo compound of 5-chloro-2-methylaniline with N-(2-carboxy-4:6-dichlorophenyl)-glycine and titrating 21.4% of a base of molecular weight 141.5, or 72 parts of the compound obtained by condensation of the diazo compound of 5-chloro-2-methylaniline with N-(2-carboxyphenyl)-glycine and titrating 19.6 of a base of molecular weight 141.5, or 48.5 parts of the compound obtained by condensation of the diazo compound of 4-chloro-2-methylaniline with N-(2-carboxyphenyl)-glycine and titrating 29.2% of a base of molecular weight 141.5, or 85 parts of the compound obtained by condensation of the diazo compound of 2-chloro-4-benzoylamino-5-methoxyaniline with N-(2-carboxyphenyl)-glycine and titrating 32.6% of a base of molecular weight 276.5, or 59 parts of the compound obtained by condensation of the diazo compound of 2-methoxy-4-benzoylamino-5-methylaniline with N-(2-carboxyphenyl)-glycine and titrating 43.2% of a base of molecular weight 256, or 42.5 parts of the compound obtained by condensation of the diazo compound of dianisidine with N-(2-carboxyphenyl)-glycine and titrating 28.8% of a base of molecular weight 244, or 49 parts of the compound obtained by condensation of the diazo compound of 5-dimethylsulphonamido-2-methylaniline with hydroxy-ethylanthranilic acid and titrating 43.6% of a base of molecular weight 214, there is obtained, with the same conditions of application as those in Example 1, a series of full-bodied browns ranging from reddish brown to nigger brown, all showing very good general fastness.

Example 7

On replacing the dye described in Example 1 by 55 parts of 4-nitro-2:2':4-trihydroxy-azobenzene, and completing the preparation of the complex and the printing paste as directed in the said example, a deep black-brown of excellent general fastness is finally obtained.

Example 8

55 parts of 4-nitro-2:2':4-trihydroxy-azobenzene are dissolved in 200 parts of water and 60 parts by volume of a solution of 10 N caustic soda. A solution of 57 parts of crystalline cobalt sulphate in 120 parts of hot water is added and the mixture is heated at 60–70° C. for a quarter of an hour. The solution is neutralised by the addition of concentrated hydrochloric acid, and the precipitate obtained is filtered and washed, then dried at 100° C.

The complex employed in Example 1 is replaced by 17 parts of the complex thus obtained and the application is finished in the same way. After neutral development, a strong black-brown with properties very similar to those of the colour described in Example 7 is obtained.

We claim:
1. Mixtures of (1) the metalliferous complexes of dyestuffs of the general formula:

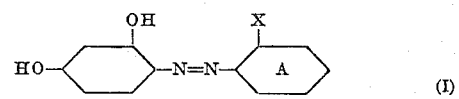

(I)

in which X represents a member selected from the group consisting of the —OH and —COOH groups and in which the benzene nucleuos A is further substituted by a member selected from the group consisting of hydrogen, halogen, methyl, methoxy, nitro, sulphonamido, acylamino and sulphone groups and of (2) a member selected from the group consisting of the hydroxyalkylamines, formamide, dimethylformamide, cyclohexylamine, pyridine, and homologues of pyridine, in which the metal is one of those having an atomic number from 24 to 29, with (3) diazoamino compounds obtained by the condensation of a diazo derivative of a phenylamine free from solubilising groups with a compound of the general formula:

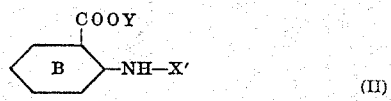

in which the benzene nucleus B is substituted by a member selected from the group consisting of hydrogen, halogen, methyl, methoxy, carboxy, sulpho and sulphonamido groups, X' represents a member selected from the group consisting of the cyclohexyl group, the unsubstituted alkyl groups having up to 3 carbon atoms and the alkyl groups having up to 6 carbon atoms substituted by a member selected from the group consisting of the —OH, —COOH, —OSO$_3$H, —SO$_3$H, —OCH$_3$, —OC$_2$H$_5$, —COOCH$_3$, —COOCH$_2$H$_5$ and —CONH$_2$ groups, and Y represents a member selected from the group consisting of the hydrogen atom and those metals yielding water-soluble salts.

2. Mixtures as claimed in claim 1 in which the metal of the complex is cobalt.

3. Process for the colouration of a material selected from the group consisting of natural and regenerated cellulose textile material which comprises applying thereto a printing paste containing a mixture as claimed in claim 1 and submitting the printed material to a neutral atmosphere.

4. Process for the coloration of a material selected from the group consisting of natural and regenerated cellulose textile material which comprises applying thereto a printing paste containing (1) a metalliferous complex of a dyestuff of the general formula:

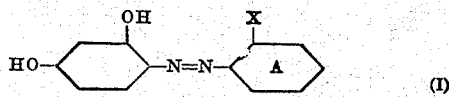

in which X represents a member selected from the group consisting of the —OH and —COOH groups and in which the benzene nucleus A is further substituted by a member selected from the group consisting of hydrogen, halogen, methyl, methoxy, nitro, sulphonamido, acylamino and sulphone groups, and (2) a member selected from the group consisting of the hydroxyalkylamines, formamide, dimethylformamide, cyclohexylamine, pyridine and homologues of pyridine, in which the metal is one of those having an atomic number from 24 to 29, in admixture with (3) a diazoamino compound obtained by the condensation of a diazo derivative of a phenylamine free from solubilising groups with a compound of the general formula:

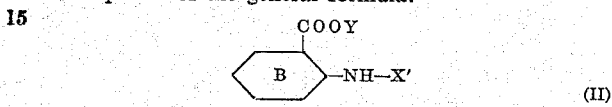

in which the benzene nucleus B is substituted by a member selected from the group consisting of the hydrogen, halogen, methyl, methoxy, carboxy, sulpho and sulphonamido groups, X' represents a member selected from the group consisting of the cyclohexyl group, the unsubstituted alkyl groups having up to 3 carbon atoms and the alkyl groups having up to 6 carbon atoms substituted by a member selected from the group consisting of the —OH, —COOH, —OSO$_3$H, —SO$_3$H, —OCH$_3$, —OC$_2$H$_5$, —COOCH$_3$, —COOC$_2$H$_5$, —CONH$_2$ groups, and Y represents a member selected from the group consisting of the hydrogen atom and those metals yielding water-soluble salts, and submitting the printed material to a neutral atmosphere.

References Cited in the file of this patent
UNITED STATES PATENTS

| | | |
|---|---|---|
| 1,221,849 | Engi et al. | Apr. 10, 1917 |
| 1,867,083 | Krzikalla | July 12, 1932 |
| 2,117,731 | Follmann | May 17, 1938 |
| 2,374,106 | Kvalnes | Apr. 17, 1945 |
| 2,416,187 | Maynard et al. | Feb. 18, 1947 |
| 2,768,053 | Streck | Oct. 23, 1956 |